Jan. 22, 1957 C. H. WINTER, JR., ET AL 2,778,726
PURIFICATION OF REFRACTORY METALS
Filed April 29, 1952
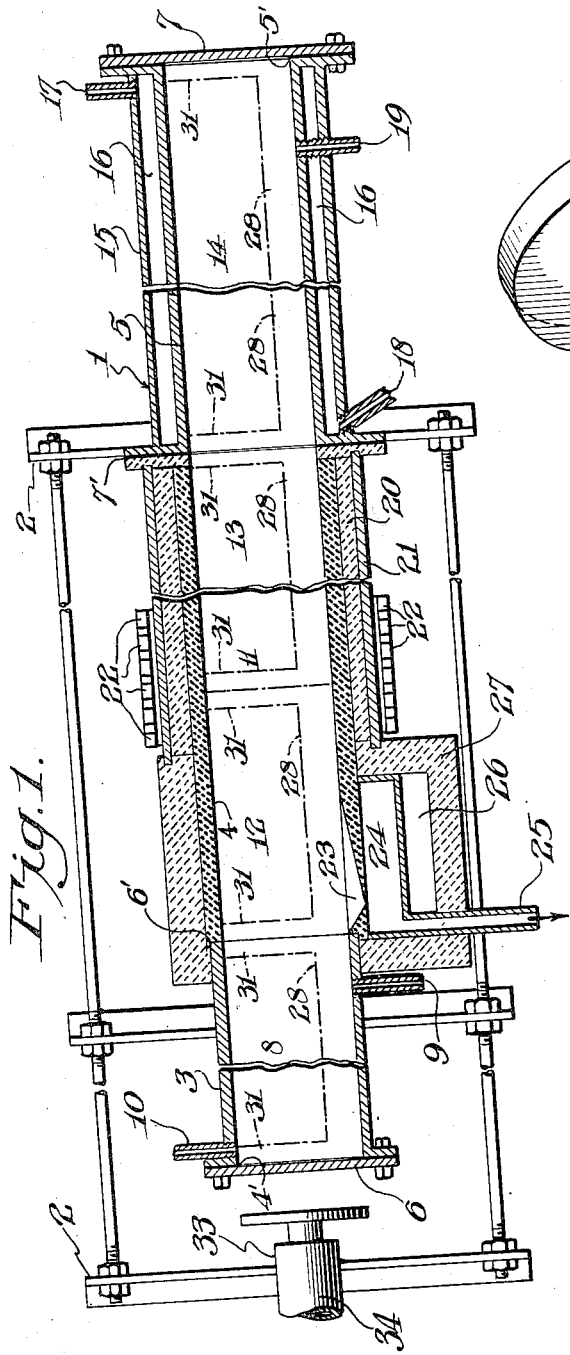
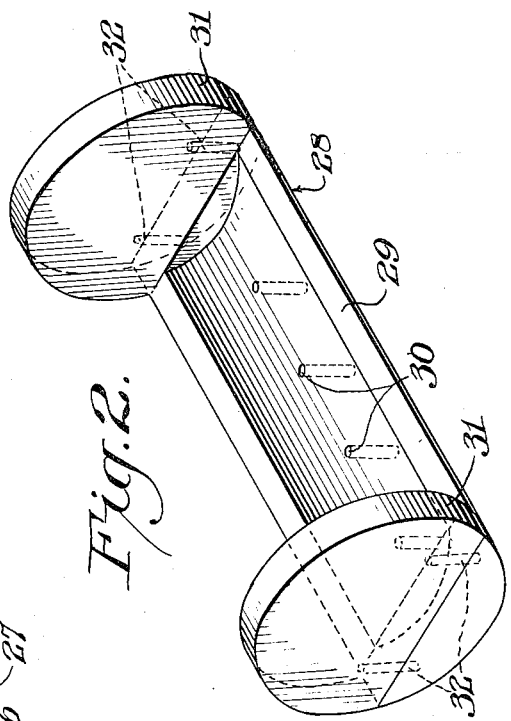
INVENTORS
CHARLES H. WINTER, JR.,
and JOHN N TULLY
BY
ATTORNEY.

United States Patent Office 2,778,726
Patented Jan. 22, 1957

2,778,726
PURIFICATION OF REFRACTORY METALS

Charles H. Winter, Jr., Wilmington, Del., and John N. Tully, New Providence, N. J., assignors to E. I. du Pont de Nemours & Company, Wilmington, Del., a corporation of Delaware Application April 29, 1952, Serial No. 284,866

6 Claims. (Cl. 75—84.5)

This invention relates to refractory metal production and more particularly to the recovery of such metals in pure condition from their reaction by-product impurities. More specifically it relates to novel methods for purifying titanium and other refractory metals through removal of residual salts and other contaminants formed with the metal during preparation thereof by reduction at elevated temperatures of a halide of the metal with an active reducing metal, such as magnesium.

In the preparation of titanium and like metals by reducing a chloride thereof with metal such as magnesium, the sponge metal reaction product obtained is contaminated with residual by-product magnesium chloride and unreacted magnesium. These impurities must be removed before the metal becomes fit for usage, which removal is usually effected by subjecting the reaction mass to aqueous leaching, vacuum distillation, or a combination of both treatments. In vacuum purification a batch type of operation is resorted to in which extreme care must be observed and strenuous efforts taken to utilize equipment which will prevent air or other contaminating material from entering into the system and contaminating the final metal product. This equipment is very costly, highly intricate, and its use entails a time-consuming operation in which constant, careful attention is at all times required. In the treatment of titanium metal in accordance with present vacuum purification practice, a temperature of approximately 950° C. must not be exceeded due to the tendency of the titanium to alloy with the iron present as constructional material in the distillation apparatus. Since this temperature is greatly below the melting point of titanium, a sponge-like mass results, which because of its high surface area is fairly sensitive to atmospheric oxidation. Further consolidation of this product is required which can be effected by subjecting it to pressure treatment and sintering at elevated temperatures under vacuum. To provide an economical type of operation in the vacuum purification, fairly large batches must be treated. However, the size of such batches is limited by the heat transfer to be effected from the exterior of the vacuum vessel to the interior of the product mass. As the diameter of the vessel becomes large, the distances to be traversed by the heat and materials being removed excessively increases so that a very long, objectionable time cycle is required to insure complete heating, evacuation and purification of the inner portions of the mass. Furthermore, since the product metal must be cooled to approximately room temperature prior to removal from the vessel, prolonged cooling-down periods must be resorted to, all of which renders excessive the total cycle time (50–60 hours) consumed in such vacuum purification.

In the alternative aqueous leaching-out procedures, soluble by-product salt is removed from the sponge by subjecting it in chip or other form to washing treatments with various solvents, a dilute aqueous acid (HCl) solution being the more economical. Considerable difficulties are also encountered in these procedures, including the development of objectionably large amounts of heat due to the heat of solution of the by-product salt, the tendency of the refractory metal to react with the solvent or solution used, the possibility of absorption of hydrogen by the product metal, and the prevailing corrosive conditions. Also, the product therefrom possesses a high surface area per unit weight and, as in the case of the vacuum distillation product, must be consolidated to provide a metal having good, stable storage properties.

A real need exists therefore for an improved economical, efficient and simple process in which separation of a refractory metal sponge reaction product from by-product salts and other contaminants can be readily effected. It is among the objects of this invention to provide such a process, and particularly one in which the separation of a refractory metal from reaction by-products and reactants can be advantageously realized and economically effected. A further object is to provide a novel method for purifying a refractory metal product and from which can be directly obtained a pure refractory metal which is relatively insensitive to atmospheric action. A specific object is to provide a continuous process for recovering refractory metals such as titanium and zirconium freed of by-product magnesium chloride and other contaminants introduced into the metal during its preparation by reduction of a chloride thereof with magnesium in an inert atmosphere and at elevated temperatures. Other objects and advantages will be apparent from the ensuing description as well as from the accompanying drawings wherein Fig. 1 is a side-elevational, sectional view of one form of apparatus in which the invention can be carried out; while Fig. 2 is a perspective view of a form of useful carrier for charging the refractory metal being treated through an apparatus of the type shown in Fig. 1.

The foregoing and other objects are attained in this invention which comprises removing by-product and other types of impurities from a refractory metal reaction product by charging said product while free from a contaminating gas through a relatively restricted, elongated treating vessel, and during the course of its passage through said vessel subjecting it under substantially atmospheric pressure to a series of heat treatments designed to remove said impurities through successive melting, draining and vaporization, and then cooling of the purified product to substantially room temperature prior to discharge from said vessel.

In a more specific and preferred embodiment, the invention comprises charging an impure titanium metal reaction product from the reduction of $TiCl_4$ with Mg into an elongated treating conduit containing a plurality of treating zones, and during the passage of said product through said conduit successively subjecting it under substantially atmospheric pressure to purging with an inert gas, to heating treatment to temperatures ranging from above the melting point of its impurity content to below the melting point of its titanium content, and then to cooling to substantially room temperature, while maintaining a current of an inert gas thereover, prior to its discharge from said conduit.

Referring to the drawings which are merely illustrative and not to scale with like numbers designating like parts throughout, and particularly to Fig. 1, there is shown an elongated, tubular type treating conduit 1 adapted to be mounted within a metal or other form of support or frame 2 and at a slight angle, preferably, from the horizontal. The conduit 1 is made up of a plurality of tubular section members 3, 4 and 5 which are secured in contiguous, gas-tight relationship to each other as shown at 6', with an insulating ring 7' being interposed between the sections 4 and 5, and is provided with an inlet 4' and an outlet 5' over which, respectively, removable cover elements 6 and 7 are operatively disposed. If desired, the member 3 can consist of sheet steel or other suitable type metal, the interior thereof comprising a purging zone 8 into which, via an inlet 9, a suitable inert type of purging gas such as argon, helium, can be fed as desired and ultimately withdrawn from said zone, together with contaminants, via a suitable outlet 10. The section member 4, disposed intermediate sections 3 and 5, comprises an inert solid substance, such as graphite, and forms, as shown, a suitable heating zone 11 made up of a melting and draining section 12 and a vaporizing section 13. The section member 5 is insulated from the crucible section 4 by means of the ring 7', can also consist of sheet steel or other metallic substance, and provides a cooling zone 14 adapted to be maintained at any desired, relatively cool state or degree of temperature by means of a suitable cooling element comprising a jacketing member 15 disposed in spaced relationship about said section whereby a fluid passage 16 is formed through which, from an inlet 17, water or other suitable cooling fluid can be passed continuously from a source of supply (not shown) and ultimately discharged from said passage through an outlet 18. An inlet 19 is also provided in the section 5 through which an inert rare gas (argon, helium, etc.) can be introduced into cooling zone 14, said inlet being preferably disposed at a point substantially adjacent the conduit outlet 5'. The intermediate heating section 4 is insulated against external heat loss by means of a suitable refractory non-conductor or insulating medium 20, such as carbon black or high temperature firebrick, and, preferably, is partially encased in a silica or other form of thermal and electrical insulating means 21. An electrical induction coil 22 is arranged about the means 21 to effect desired heating of the zone 11 and its sections 12 and 13. The base of conduit section 4 which is disposed within the melting and draining section 10 is suitably channeled and also apertured to form a plurality of drain ports 23 through which melted or condensed impurities freed in the heating zone 11 can be readily and continuously withdrawn for passage into by-product trap or sump 24 and thence into a withdrawal outlet 25 to remove such impurities from the system for treatment, if desired, to recover or reuse their constituents. The trap 24 and outlet 25 can be maintained at any desired temperature by means of an associated furnacing means 26 suitably insulated by means of a refractory insulating medium 27 so that by-products issuing from the ports 23 will remain in liquid or molten condition.

Referring to Fig. 2, one useful, convenient form of carrier or conveyor means 28 is shown upon or within which a charge of metal sponge can be suitably passed through the conduit 1 and its various treating zones 8, 11 and 14. The conveyor 28 readily retains said sponge during and throughout its travel through the separation unit, and in the form shown assists in sealing it off during charging into and discharge from the unit whereby inert gas loss is minimized and condensation of vaporized material is prevented in the cooling zone. The carrier 28 comprises an inert, refractory type of materials, preferably graphite, which is shaped from a rectangular or other form of blank and is hollowed longitudinally to provide a base portion 29 having a plurality of apertures or drain ports 30. The bottom of said base 29 is suitably rounded or otherwise shaped to conform to the inner contour of the inner surface of the conduit 1 over which the carrier is slidably transported or advanced when used in treating a metal reaction product. A pair of upright end plates 31 is also provided on the carrier element, being formed integrally thereof or secured to the base 29 as shown by means of dowels 32 or otherwise.

In practically adapting the invention, any type of impure or by-product salt-contaiminated metal reaction product, particularly from such reduction procedures as are disclosed in U. S. Patents 2,205,854, 2,171,439, 2,214,211, 2,148,345, 2,556,763, 2,567,838, or 2,564,337, etc., can be treated under the invention. For example, a crude $MgCl_2$-containing titanium metal sponge in either ingot or finely divided solid form, and such as is obtained from the reduction under an inert atmosphere at temperatures ranging from 750–1100° C. of titanium tetrachloride with magnesium, can be charged in a suitable manner into the lower or inlet end of the elongated treating conduit 1, which, preferably, is inclined at an angle of about 5° from the horizontal. Preferably, also, such charging and passage of the product through the apparatus is effected while said product is retained upon the conveyor 28, this being brought about through recourse to a manually or mechanically operated plunger means such as hydraulic ram 33 arranged in suitable association with said inlet and capable of advancing the charge from zone to zone upon desired treatment in each zone. Thereafter, the purified product is exited from the conduit through outlet 5'. As shown, the ram 33 is mounted for reciprocal movement in a journal 34 adapted to be supported in the frame 2. After introduction, the charge is maintained in the purging zone 8 and isolated from the remainder of the apparatus zones by means of the upright end plates 31 of conveyor 28. After such introduction, cover plates 6 and 7 are secured in closed, gas-tight relationship upon the conduit so that inert gas loss is prevented or minimized. The vaporization zone 13 is brought to a temperature above the normal boiling point of the impurities in the sponge but below the normal point of the titanium or other metal content thereof. In titanium purification, temperatures of from about 1400–1700° C. are preferably resorted to. Concurrently, the cooling zone 14 is maintained at a temperature sufficiently low to insure cooling of the purified sponge when charged into that zone to a non-reactive temperature, prior to discharge from the apparatus, such cooling being effected by continuously flowing a suitable cooling medium through the cooling passages 16. In the zone 8, the sponge is subjected to purging by passing from the inlet 9 an inert rare gas thereover, such treatment being continued until the gases exiting from the outlet 10 are free of contaminating gases. After purging, the product is conveyed into the melting and draining zone 12, which zone, due to its relatively close proximity to the hot vaporization zone 13, is maintained at a temperature sufficiently high to initially melt and drain the $MgCl_2$ and Mg or like impurities from the charge for continuous withdrawal from the conduit 1 and the system through drain ports 23 and heated sump 24 and outlet 25. Upon attaining desired impurity melting and draining in the zone 12 the partially purified sponge is advanced into the vaporization zone 13 wherein the remaining $MgCl_2$ by-product salt or other impurities are removed by vaporization. During this latter treatment, a countercurrent flow of a small amount of an inert gas is maintained over the charge, said gas being introduced into the system through the inlet 19 in cooling zone 14 and functioning to carry vapors evolved in the vaporization to the melting zone 12 for discharge through a release port in the molten contaminants removal outlet 25, as well as to prevent Mg and $MgCl_2$ vapors from diffusing into said cooling zone and recontaminating a previously purified sponge charge undergoing treatment in that zone. Upon conclusion of the vaporization treatment in the zone 13, the purified sponge is then passed into the cooling zone 14 for cooling to below the temperature indicated above and is then discharged from the treating conduit through outlet 5' after removal of the closure plate 7 to recover the purified metal product. Air entrance into the apparatus during such discharge is prevented by the inert gas purge being fed to the system via the inlet 19 in the cooling zone 14 and located adjacent said discharge outlet.

To a clearer understanding of the invention, the following specific examples thereof are given. These are illustrative only and not to be taken as limiting the underlying principles or scope of the invention:

Example I

Employing a Fig. 1 type of apparatus comprising a 13′ graphite, tubular conduit having a 10″ internal diameter and inclined at a 5° angle from the horizontal, a charge consisting of a 3′-long, 9¾″-diameter cylinder obtained from the reduction of $TiCl_4$ with magnesium and containing approximately 20% Ti, 2% Mg, and 78% $MgCl_2$, by weight, was fed into the lower, inlet end of said conduit. The latter contained three treating zones the first, 4′ in length and unheated, comprising a purging zone; the second, also 4′ in length and maintained at a temperature of about 1500° C. by induction heating, comprising a heating and vaporization zone; while the third, 5′ in length, unheated but water cooled, comprised a cooling zone for the system. The heated section was insulated with carbon black and enclosed in a fused silica shell. Upon introduction of the sponge charge into the apparatus, the inlet and outlet thereof were closed and passage of the charge from zone to zone was effected by means of a graphite plunger regulated to pass the charge through the apparatus at a feed rate of 16″ per hour, which corresponded to approximately 20 pounds of Ti per hour. Treatment of the charge was effected at substantially atmospheric pressure and a period of approximately 3 hours' time was consumed in passing the charge through each of the purging and heating zones. During the heating and vaporization treatment, a purge of 10 cubic feet/hour of argon gas was maintained from the discharge end of the apparatus through the cooling zone. Mg and $MgCl_2$ removed from the sponge during the operation were drained as liquids from the underside of the 10″ graphite conduit at the 800° C. end of the furnace through a 1″ withdrawal outlet, heated to maintain its internal temperature above the melting point of $MgCl_2$. Upon being cooled in the cooling zone, the purified product was discharged from the cool end of the apparatus within less than 10 hours from commencement of treatment and comprised a suitably consolidated, satisfactorily pure form of titanium metal having the composition:

| | Percent |
|---|---|
| Ti | 99.7 |
| Mg | 0.02 |
| $Cl_2$ | 0.08 |

In a comparable operation involving an ingot having the same composition but in which resort was had to a prior vacuum type purification, a period of 48 hours was required to obtain a product exhibiting the final composition above but which required further consolidation prior to use.

Example II

A plurality of solidified sponge metal titanium cylinders recovered from a $TiCl_4$ reduction with Mg was subjected to purification treatment in a tubular apparatus of the type shown in Fig. 1. Each cylinder was 3 feet in length and 15 inches in diameter, weighed approximately 375 pounds, and contained approximately 120 pounds Ti, 13 pounds of Mg and 242 pounds of $MgCl_2$. Prior to treatment, each cylinder was placed in a graphite conveyor "boat" of the type shown in Fig. 2, comprising a 6-inch thick, 4-foot length of graphite hollowed longitudinally to form a supporting base or plate element for the cylinder, the bottom portion thereof being suitably rounded to conform to the internal contour of the tubular apparatus. Advantageously, said base plate when used in the treating apparatus served as a graphite-to-graphite sliding surface to promote ease of passage of the conveyor through the treating conduit. Each conveyor carried at its ends in secured relationship to its base plate upright graphite discs 3 inches thick and 21 15/16 inches in diameter, with a sector equivalent to the plate being cut out of one of each discs. The latter serve as sliding seals adapted to confine the product under treatment within the particular apparatus zone into which the conveyor is fed in its passage through the tubular treating apparatus. In addition, they prevent recondensation of volatiles upon the purified product after it is charged into the cooling zone prior to discharge from the apparatus.

Upon loading, the conveyors were intermittently introduced (at a rate of one each hour) into the lower end of the treating apparatus which was maintained in closed state after each introduction. This apparatus comprised a 56-foot tubular conduit inclined at a 5° angle from the horizontal. Its internal diameter was 22 inches, its purging zone was 4 feet in length; its central section or heating, melting and vaporization zone was 12 feet in length; and its jacketed, water-cooled cooling zone was 12 feet in length. Said central section was constructed of graphite, the heating and melting zone portion thereof being provided with apertures permitting passage of liquid and vapor past the discs on the conveyor, and was enclosed within a 25-foot-long, graphite resistor-heated furnace which maintained the vaporization zone at 1400–1500° C. The feed and discharge ends of the conduit were constructed of steel and provided with flexible connections adapted to collapse by external gas pressure so as to firmly seal against the conveyor discs and prevent argon loss between the apparatus charging and discharging periods. Throughout the purification operation, which was effected at substantially atmospheric pressure, a purge of 30 cu. ft./hr. of argon was maintained in both the feed and discharge ends of the apparatus, such purge being withdrawn from the system with the liquid Mg and $MgCl_2$ formed during the treatment through a 2-inch drainport maintained in the underside of the heating and melting zone apparatus section. The argon flow maintained from the discharge end of the apparatus augmented prevention of vapor diffusion and volatile recondensation on the products undergoing treatment in the cooling zone. To effect passage of the cylinder-charged conveyors through the apparatus, recourse to a graphite plunger element was had.

The residence times of product of 1 hour in the purging zone, 3 to 3½ hours in the heated zone, and 3 hours in the cooling zone were resorted to. From this operation a production rate of approximately 120 pounds of pure Ti/hr. having the same analysis as the product from Example I was obtained.

Example III

Example II was duplicated except that solidified sponge metal zirconium cylinders of the same length and diameter obtained from the reduction of $ZrCl_4$ with Mg were treated, each weighing 450 pounds and containing approximately 210 pounds of Zr, 10 pounds of Mg, and 230 pounds of $MgCl_2$. From this operation a production rate of 210 lbs. of pure Zr/hr. was achieved in a zirconium metal product obtained which had the following composition:

| | Percent |
|---|---|
| Zr | 99.8 |
| Mg | .01 |
| $Cl_2$ | .05 |

Although the invention has been described in its application to certain specific and preferred embodiments, obviously it is not restricted thereto and variance therefrom can be resorted to without departing from its underlying principles and scope. Thus, while preeminently suited to treat a stick-like metal product particularly from the reduction of $TiCl_4$ or $ZrCl_4$ with Mg, it is equally useful for effecting the purification of other forms or shapes of products, such as sponge-like metal masses or solid particles mixed with by-product salt from other metal reduction processes. In general, it is applicable to the treatment of refractory metals, such as Ti, Zr, Be, Hf, Cr, V, U, Th, Ta, W, Mo, resulting from the reduction of a metal halide (chloride, bromide, iodide) salt of the metal with an alkali (Na, K, Li) or alkaline earth (Ca, Ba, Sr) reducing metal, including Mg, at elevated temperatures, say, from 750–1100° C., and preferably at from 850–950° C., under an atmosphere of the chloride reactant or inert rare gas such as argon, helium, neon. Preferably, the metal-containing mass consists of a suitable size solid adapted to be charged into and through the unit, this size depending upon the size of the separation equipment and conveyors if the latter are utilized.

In a continuous operation of the distillation unit, the conditions of operation are subject to extreme variation. The temperatures encountered can vary from room temperature at both the entrance and exit ends of the apparatus to a maximum temperature of less than the melting point of the metal being purified. The zone wherein drainage occurs requires the maintenance of a temperature at least equal to the melting point of the by-product salt impurity. Observing these limits will insure retention of the product metal in the solid state throughout the treatment and removal of the by-product salt therefrom by draining in the liquid state. The temperature within the hottest or vaporization zone of the unit can range from the melting point of the by-product salt to just below the melting point of the product metal. The lower range of these temperatures (in the instance of titanium metal production, 708–1000° C.) provides a low vapor pressure of by-product salt and therefore long retention times and high volume of inert gas purging to remove residual volatiles. The use of higher temperatures than those just mentioned and of an order of, say, 1000–1700° C. or near the melting point of the product metal, is preferably resorted to since they provide higher vapor pressures and decreased time and gas for volatilization.

As indicated, both a fully continuous operation and intermittent introduction of the feed material and discharge of purified metal are contemplated and feasible in the invention, although intermittent operation may be preferable where recourse to mechanical seals of simplified construction is desired. As will be recognized, suitable gas lock chambers can be associated with the apparatus inlet and outlet to facilitate or expedite impure metal product introduction and pure product discharge.

The temperatures required in the heating, melting and vaporization zones can be obtained by either separate heating means with thermal insulation therebetween, or the zones can be coexistent within a continuous conduit, with the central portion acting as the vaporization zone and subjected to heating to the highest temperature. In such instance, the temperature will decrease toward both ends of the apparatus and the zones will not be sharply defined but will overlap slightly. The heating means resorted to can comprise any which will provide the desired temperature and yet not cause contamination of the metal product. Among utilizable methods those of induction heating, electrical arc, electrical conduction, graphite rod heaters, and metallic resistors, can be mentioned. Obviously, other known types conventional in the furnacing art can also be used, if desired.

While a cylindrical type of treating conduit is preferred for use and is illustrated and employed in the drawings and examples, other forms, shapes, and types of apparatus can also be employed, including rectangular, square, or angular cross-section provided with separate treating zones into and through which a metal to be purified can be successively passed. Preferably, and as shown, the treating conduit is inclined from the horizontal while in use, with its outlet end disposed at a higher level than its inlet. However, it will be equally suitable to utilize a conduit in a horizontal plane with the draining channels in the conduit wall through which molten by-product salt is removed, increasing in depth toward the withdrawal port to thereby direct the flow of molten material to this port. Similarly, while graphite comprises a preferred type material for use in constructing the heating and vaporizing zone conduit walls and conveyor "boats," other materials which are substantially inert toward the reaction products under the conditions of treatment can be used. Graphite is especially suitable for use because of these factors and also because of its low frictional characteristics.

The pressure maintained throughout the separation apparatus is essentially that of atmospheric, with preferably a slight positive pressure of inert gas prevailing therein to prevent air or other gaseous contaminant entrance into the system. Inert rare gas such as argon, helium, neon, etc., is preferred for use as the means for removing contaminating gases from the metal reaction product mass prior to its introduction into the heating, vaporization, and cooling zones of the apparatus, but if desired other means of purging such as vacuum degassing, etc., can be resorted to.

The composition of the vapors within the apparatus will vary depending upon the point at which a sample is taken and the type and nature of impurities and contaminants being evolved and removed from the metal product. This composition is also dependent upon the operation that is taking place at the particular position and the ambient temperature and direction of flow of vapors. For example, in the high temperature zones a higher content of unconverted reactants and by-product salt vapors is likely to exist, while in the cooler or end portions of the apparatus the composition will comprise essentially all inert gas. Consequently, the intermediate zones will exhibit quite variable compositions.

The present process affords a distinct advance over the art in that it advantageously eliminates recourse to vacuum treatment of the metal reaction products, and removes the many problems which attend use of complex vacuum equipment and their necessary operational care. At the same time the use of a slight positive pressure over that of the atmosphere effectively insures against oxygen and nitrogen contamination which would otherwise result should they enter the unit. The invention is also extremely well adapted to either a continuous or batch type of operation to obtain a highly satisfactory separation and recovery of by-product salt and unconverted reactants from the product metal. By its employment, a two- to ten-fold increase in the amount of pure Ti/hr. recovered and a like-fold decrease in distillation treatment time are advantageously afforded. At the same time a preliminary consolidation of the metal product will be found to take place. This consolidation produces a shrinkage of the sponge-like metal product and provides a less reactive metal due to the decreased surface area of the final mass. In a continuous operation an extremely important saving will be found to result in energy needed to remove the product salt because, with the directed flow of by-product vapors from the vaporization zone, their condensation and subsequent release of heat of vaporization is utilized to provide melting of by-product salt in the portion of the mass entering the more highly heated vaporization zone. The molten by-product salt is then drained from the apparatus and the overall heat requirement is thus held to the heat of melting, the added heat of vaporization not being required for the separation step. By this means decided savings result in the amount of energy required for such separation step.

We claim as our invention:

1. A process for removing a by-product salt contaminant from a solid refractory metal reaction product recovered from the reduction of a metal halide with a reducing metal, comprising charging said reaction product upwardly and in intermittent stages through a closed, elongated treating conduit inclined at an angle from the horizontal and from an inlet to a discharge outlet of said conduit, during its passage through said conduit heating said reaction product, under substantially atmospheric pressure, to a temperature above the melting point of said salt contaminant but below the melting point of the metal component present in said reaction product, removing said by-product from said reaction product and the system during said heating and while said product is being successively passed through melting, draining and vaporization zones maintained in said conduit, maintaining a counterflow of an inert gas over the reaction product during its treatment in said vaporization zone and flowing said gas from said vaporization zone into and through said melting and draining zones, and prior to discharge of the resulting purified metal product from said conduit cooling it to a non-reactive temperature.

2. A process for separating and removing reaction by-product metal chloride contaminant from a solid refractory metal reaction product recovered from the reduction of a metal chloride with a reducing metal, comprising charging said reaction product upwardly and in intermittent stages through a closed, elongated treating conduit inclined at an angle from the horizontal and from an inlet to a discharge outlet of said conduit, during its passage through said conduit heating said reaction product, under substantially atmospheric pressure, to a temperature above the melting point of said salt contaminant but below the melting point of the metal component present in said reaction product, removing said by-product from said reaction product and the system during said heating and while said product is being successively passed through melting, draining and vaporization zones maintained in said conduit, maintaining a counterflow of an inert gas over the reaction product during its treatment in said vaporization zone and flowing said gas from said vaporization zone into and through said melting and draining zones, and prior to discharge of the resulting purified metal product from said conduit cooling it to a non-reactive temperature.

3. A process for removing a by-product salt contaminant from a solid refractory metal reaction product recovered from the reduction of a metal halide with a reducing metal, comprising charging said reaction product upwardly and in intermittent stages through a closed, elongated treating conduit inclined at an angle from the horizontal and from an inlet to a discharge outlet of said conduit, during its passage through said conduit heating said reaction product, under substantially atmospheric pressure, to temperatures ranging from 1000–1700° C., removing said by-product from said reaction product and the system during said heating and while said product is being successively passed through melting, draining and vaporization zones maintained in said conduit, maintaining a counterflow of an inert gas over the reaction product during its treatment in said vaporization zone and flowing said gas from said vaporization zone into and through said melting and draining zones, and prior to discharge of the resulting purified metal product from said conduit cooling it to a non-reactive temperature.

4. A process for removing by-product metal chloride salt contaminant from a solid refractory metal reaction product recovered from the reduction of a metal chloride with a reducing metal, comprising charging said reaction product upwardly and in intermittent stages through a closed, elongated treating conduit inclined at about a 5° angle from the horizontal and from an inlet to a discharge outlet of said conduit, during its passage through said conduit heating said reaction product, under substantially atmospheric pressure, to a temperature ranging from about 1000–1700° C., removing said by-product chloride salt contaminant from said reaction product and the system during said heating and while said product is being successively passed through melting, draining and vaporization zones maintained in said conduit, maintaining a slow countercurrent flow and positive pressure of an inert gas over the reaction product during its treatment in said vaporization zone and flowing said gas from said vaporization zone into and through said melting and draining zones, and prior to discharge of the resulting purified metal product from said conduit cooling it to a non-reactive temperature.

5. A process for separating and removing a reaction by-product chloride salt contaminant from a solid titanium metal reaction product recovered from the reduction of a titanium chloride with a reducing metal, comprising charging said reaction product upwardly and in intermittent stages through a closed, elongated treating conduit inclined at about a 5° angle from the horizontal and from an inlet to a discharge outlet of said conduit, during the passage of said reaction product through said conduit heating said product under substantially atmospheric pressure and an inert atmosphere, to a temperature above the melting point of said by-product salt impurity but below the melting point of said titanium metal, removing said by-product salt from said reaction product and the system during said heating and while said product is being successively passed through melting, draining and vaporization zones maintained in said conduit, maintaining a counterflow of an inert gas over the reaction product during its treatment in said vaporization zone and flowing said gas from said vaporization zone into and through said melting and draining zones, and prior to discharge of the resulting purified titanium metal product from said conduit, cooling it to a non-reactive temperature.

6. A process for removing magnesium chloride salt impurity from a solid titanium metal reaction product recovered from the reduction of titanium tetrachloride with magnesium from the reduction at elevated temperatures of titanium tetrachloride with magnesium, comprising charging said reaction product upwardly and in intermittent stages through a closed, elongated treating conduit maintained at about a 5° angle from the horizontal and under an inert gaseous atmosphere and at substantially atmospheric pressure, during its passage through said conduit, heating said reaction product to temperatures ranging from about 1000–1700° C., removing by-product magnesium chloride from said reaction product and the system during said heating and while said solid titanium metal reaction product is being successively passed through purging, melting, draining and vaporization zones maintained in said conduit, maintaining a slow countercurrent flow of an inert gas over the titanium metal reaction product during its treatment in said vaporization zone and flowing said gas from said vaporization zone into and through said melting and draining zones, and prior to discharge of the resulting purified titanium metal product from said conduit cooling it to a non-reactive temperature in a cooling zone in said conduit.

References Cited in the file of this patent

UNITED STATES PATENTS

| | | |
|---|---|---|
| 2,205,854 | Kroll | June 25, 1940 |
| 2,486,475 | Kawecki | Nov. 1, 1949 |
| 2,556,763 | Maddex | June 12, 1951 |
| 2,564,337 | Maddex | Aug. 14, 1951 |
| 2,586,134 | Winter | Feb. 19, 1952 |
| 2,607,674 | Winter | Aug. 19, 1952 |
| 2,618,549 | Glasser et al. | Nov. 18, 1952 |
| 2,618,550 | Hampel et al. | Nov. 18, 1952 |
| 2,663,634 | Stoddard et al. | Dec. 22, 1953 |
| 2,734,244 | Herres | Feb. 14, 1956 |

OTHER REFERENCES

Journal of Metals, April 1950, pages 634–640.